Aug. 6 1974   E. H. AUGUSTIN ET AL   3,827,872
GLASS TEMPERING METHOD
Filed Aug. 18, 1972

United States Patent Office 3,827,872
Patented Aug. 6, 1974

---

3,827,872
GLASS TEMPERING METHOD
Eugene H. Augustin, Dearborn Heights, and William P. Long, Taylor, Mich., assignors to Ford Motor Company, Dearborn, Mich.
Filed Aug. 18, 1972, Ser. No. 281,881
Int. Cl. C03b 27/00
U.S. Cl. 65—114                                 2 Claims

ABSTRACT OF THE DISCLOSURE

An improved method of tempering glass is disclosed. The improvement comes in the step of preheating the trailing edge of a glass sheet supported on a glass handling fixture prior to the glass sheet's entry into a glass heating chamber. The other steps of the method are as taught in the glass tempering art. The preheating step reduces the tendency for a heated glass sheet to break when it is rapidly cooled in a quenching station.

BACKGROUND OF THE INVENTION

The prior art teaches a glass tempering method. The tempering method is one wherein a glass sheet is positioned on a glass handling fixture. The glass handling fixture is conveyed through a glass heating chamber wherein the glass sheet is heated to a temperature in the range from about 1200° F. to about 1250° F. When the major portion of the glass sheet has reached the correct temperature, the fixture upon which the glass sheet rests is rapidly removed from the glass heating chamber and located within a glass quenching station. At this station, a quenching medium is applied to the sheet to reduce rapidly the temperature of the sheet from the high temperature to an ambient temperature. This rapid reduction in the glass temperature causes a tempering of the glass sheet.

Problems have been encountered in the above described tempering method because the leading edge of the glass sheet is generally heated to a higher temperature than the sheet's trailing edge. This comes about because the glass handling fixture, upon which the glass sheet rests, is initially introduced into and thereafter progresses through the glass heating chamber at a low speed. However, the fixture is extracted from the glass heating chamber at a high speed. Since there is a speed differential between entering and leaving the heating chamber, the residence time of the trailing edge of the glass sheet is not the same as the residence time of its leading edge.

In general, it has been found that the leading edge of a heated glass sheet is 20° F. or more hotter than the trailing edge of the glass sheet prior to its quenching. If the glass sheet has such a temperature differential between these two edges, generally the trailing edge temperature will be below a critical quenching temperature and the glass sheet will have a higher tendency to break in the quenching operation when large amounts of stresses are generated within the bulk of the glass. Similar breakage problems also occur where holes are drilled through the glass sheet.

SUMMARY OF THE INVENTION

This invention relates to a method of improving the tempering of glass sheets and, more particularly, to a method of improving the tempering of glass sheets by reducing the tendency for such glass sheets to break when quenched.

In general, the method of this invention includes the following steps known in the glass tempering art. A glass sheet is positioned on a glass handling fixture and the fixture is conveyed through a glass heating chamber in a manner such that the glass sheet has a leading edge and a trailing edge. The glass handling fixture is rapidly withdrawn from the glass heating chamber when the glass sheet is heated to a proper temperature. Upon withdrawal from the heating chamber, the glass sheet is positioned in a glass quenching station whereat the temperature of the glass sheet is reduced rapidly to temper the glass sheet. This invention teaches an improvement in this tempering method which results in a reduction of the number of heated glass sheets which break when quenched. The improvement comes by preheating the trailing edge of the glass sheet as it rests on the glass handling fixture prior to the glass sheet's entry into the glass heating chamber. An improvement can also be achieved by preheating areas about holes which pass through the glass sheet.

In greater detail, the preheating of the glass sheet is carried out in an amount such that the heated glass sheet will emerge from the heating chamber with a temperature at its trailing edge within plus or minus 10° F. of the temperature of the leading edge. In further detail, the method of this invention teaches the preheating of the glass sheet in the area of the trailing edge and, if desired, in the area of any holes therethrough by heating the glass sheet in such areas to a temperature in the range of from about 300° F. to about 400° F.

DESCRIPTION OF THE PREFERRED EMBODIMENT

Figure 1:
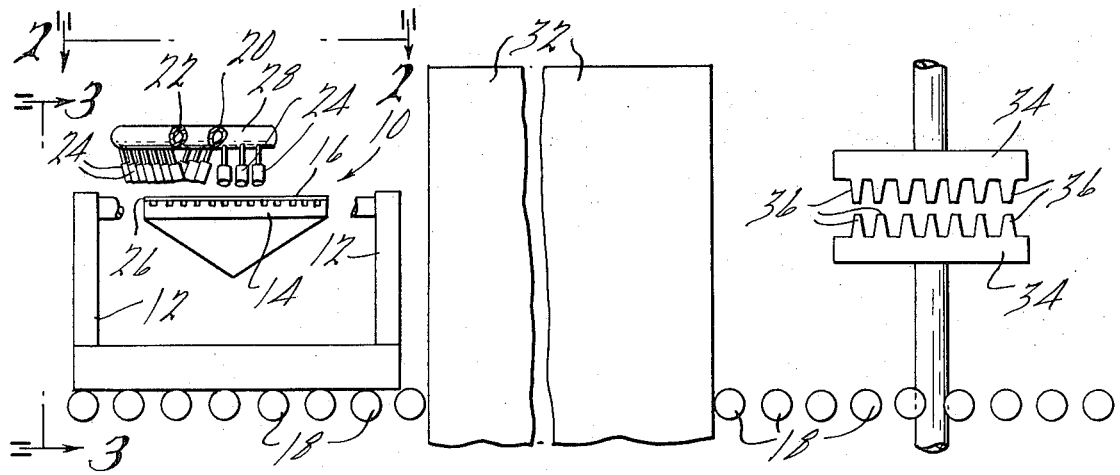
FIG. 1 is a schematic, side elevational view of apparatus for carrying out the method of this invention.

The method of this invention may be understood by making reference to the Figures of the drawings while studying the following material. In FIG. 1, an apparatus for preheating selected areas of a glass sheet to be tempered is shown and generally designated by the numeral 10. A glass handling fixture 12 of standard construction is partially shown. This handling fixture is constructed in accordance with the teachings of the prior art and is of the type which includes a ring mold 14. As is well known in the art, when a glass sheet is heated on the ring mold, the glass sheet will soften and sag into contact with the ring outline, thereby to be bent into a particular configuration. Since the glass handling fixture and ring mold are of standard construction, no further discussion thereof will be undertaken.

Figure 2:
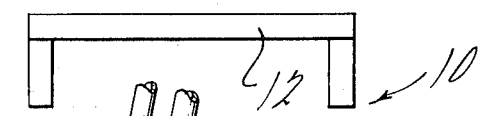
FIG. 2 is a plan view of the preheating apparatus taken along line 2—2 of FIG. 1.
Figure 2:
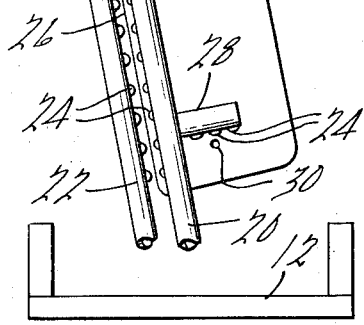
Figure 3:
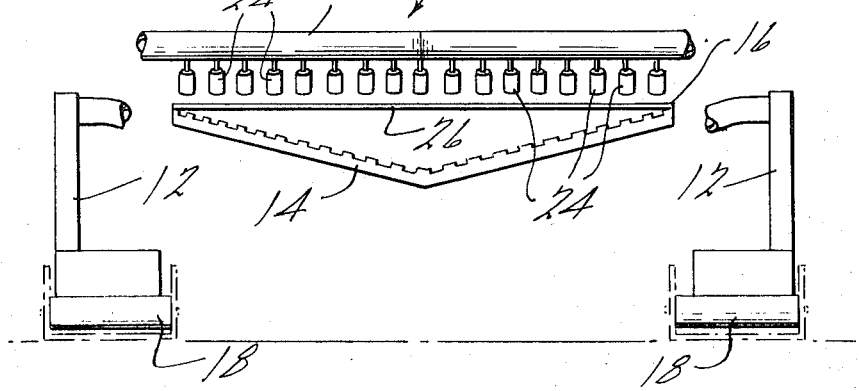
FIG. 3 is an end elevation view of the preheating apparatus taken along line 3—3 of FIG. 1.

A glass sheet 16 is shown in a position resting on the ring mold 14. In FIG. 1, the glass handling fixture 12 is shown as positioned on a plurality of rollers 18 at a glass preheating station. Above the glass preheating station, there is found a pair of gas carrying manifolds 20 and 22 supported by suitable structure (not shown) and connected to a gas supply system (not shown). The manifolds have a plurality of gas burners 24 dependent therefrom. The burners 24 are designed to position a flame on a trailing edge 26 of the glass sheet 16. As is best understood by reference to FIGS. 1 and 2, a secondary manifold 28 positions additional burners 24 in the area of a small drilled hole 30 which passes through the glass sheet. The burners are effective to raise the temperature of the trailing edge and of the area around the hole 30 to a temperature between 300° F. and 400° F., preferably about 350° F. prior to the entry of the glass sheet and the glass handling fixture 12 into a glass heating chamber 32 shown only in FIG. 1.

In the glass heating chamber 32, the glass sheet 16 is heated on the ring mold to a temperature in the range of from about 1200° F. to about 1300° F. At such a temperature, the glass becomes pliable and it sags into contact with the ring mold. In a typical glass tempering installation, the glass heating chamber will have four zones, each about twelve feet long, which are generally maintained at temperatures preceding from the first zone to the last zone of about 1300° F., about 1200° F., about 1200° F. and about 1350° F. The speed of movement of the glass handling fixture through the heating chamber in the first three and one half zones is at a rate of about 195 inches per minute. This rate is increased to a rate of about 1200 inches per minute in the last half of the last zone of the glass heating chamber. The higher exit speed is used so that the heated glass sheet may be rapidly positioned between a pair of quenching heads 34 of standard design located at a glass quenching station. Jets of a quenching medium, for example, cold air are fed through a plurality of orifices 36 onto the glass sheet in order to quench the same. By a rapid quenching action known to those skilled in the art, the glass is tempered so that when it breaks it will fragment into a plurality of small pieces. Since the sheet is withdrawn from the furnace at a more rapid rate than it is introduced therein, the trailing edge 26 of the glass sheet 16 is cooler than the leading edge of the glass sheet when the sheet is introduced into the quenching station. If this temperature difference is so great that an edge of the sheet is below a critical quenching temperature, the stress that is set up during the quenching operation will be in excess of that which may be tolerated at the edge of the glass and the glass will break.

The method of this invention teaches the utilization of the apparatus for preheating the glass at a preheating station prior to entry of the glass into a glass heating chamber. The heating of the glass along its trailing edge, and in the area of any holes which have been drilled in the glass, is carried out for a sufficient time that when the glass sheet is exited from the glass heating chamber, the trailing edge temperature will be plus or minus 10° F. within the temperature of the leading edge of the glass and, generally all edges will be above the critical quenching temperature. Because of the closer match in temperature, very little, if any, breakage occurs at the quenching station. As previously stated, the amount of heat applied to the areas to be preheated is sufficient to generate a temperature of about 300° F. to about 400° F. in these areas where the remainder of the glass is at substantially an ambient temperature.

Another interesting result achieved by the use of the method of this invention is that less care may be given in the edge finishing of a glass to be tempered after use of the preheating step of this invention. More particularly, glass which breaks in quenching generally breaks because of a failure of the glass in tension at its edges, particularly, the trailing edge or at an opening such as a drilled hole through the glass. It has been found that if such edges are carefully finished, for example, by diamond edge finishing they would have a normal strength in tension better than 9000 p.s.i. Such a sheet can go through a normal quenching operation without preheating of the trailing edge even if there was a differential in temperature between leading and trailing edges of 20° or 30° F. However, the diamond edge finishing of the glass sheet to produce such a high strength is costly. By utilizing the preheating step of the method of this invention, such diamond edge finishing is not necessary and a simple belt edge finishing operation producing a nominal strength of no more than 7500 pounds per square inch in tension is suitable for such glass sheet thereby reducing the total cost of preparation of the sheet.

We claim as our invention:

1. In a glass tempering method wherein a glass sheet having at least one opening therethrough is positioned on a glass handling fixture, wherein the glass handling fixture is conveyed through a glass heating chamber in a manner such that the glass sheet has a leading edge and a trailing edge, wherein the glass handling fixture is rapidly withdrawn from the glass heating chamber and positioned in a glass quenching station, and wherein the temperature of the glass sheet is rapidly reduced in the glass quenching station thereby to temper the glass sheet, the improvement which reduces the tendency for the heated glass sheet having at least the one opening therethrough to break when quenched comprising the step of:
preheating both the trailing edge of the glass sheet and an area about the opening through the glass sheet while the glass sheet is positioned on the glass handling fixture prior to the glass sheet's entry into the glass heating chamber.

2. The method of Claim 1 wherein the opening is one which has been produced by a hole drilling operation.

References Cited

UNITED STATES PATENTS 3,365,285    1/1968    Richardson _____ 65—104

ARTHUR D. KELLOGG, Primary Examiner

U.S. Cl. X.R.

65—104